(12) United States Patent
Mori et al.

(10) Patent No.: US 6,468,935 B1
(45) Date of Patent: Oct. 22, 2002

(54) OPTICAL GLASS

(75) Inventors: Yoshio Mori; Muneo Nakahara, both of Sagamihara (JP)

(73) Assignee: Kabushiki Kaisha Ohara, Sagamihara (*) Notice: Subject to any disclaimer, the term of this patent is extended or adjusted under 35 U.S.C. 154(b) by 0 days.

(21) Appl. No.: 09/889,408

(22) PCT Filed: Nov. 29, 2000

(86) PCT No.: PCT/JP00/08389

§ 371 (c)(1),
(2), (4) Date: Jul. 17, 2001

(87) PCT Pub. No.: WO01/40127

PCT Pub. Date: Jun. 7, 2001

(30) Foreign Application Priority Data

Nov. 30, 1999 (JP) .................................. 11-341330

(51) Int. Cl.⁷ .................................................. C03C 3/07
(52) U.S. Cl. .......................... 501/74; 501/901; 501/903
(58) Field of Search .................... 501/74, 901, 903

(56) References Cited

U.S. PATENT DOCUMENTS 3,486,914 A * 12/1969 Janakarima-Rao ........... 501/74
3,826,660 A * 7/1974 Wylot et al. ................. 501/74
3,826,661 A * 7/1974 Greco et al. ................. 501/74
5,932,504 A * 8/1999 Terashima et al. .......... 501/75

FOREIGN PATENT DOCUMENTS

| EP | 0 487 863 A2 | 6/1992 |
| JP | B2 55-11627 | 3/1980 |
| JP | 3-109235 A | 5/1991 |
| JP | 04362039 A * | 12/1992 |
| JP | 5-319864 A | 12/1993 |
| JP | 6-274815 A | 9/1994 |
| JP | A 7-239489 | 9/1995 |
| JP | 11106236 A * | 4/1999 |

OTHER PUBLICATIONS

O'Bannon, Dictionary of Ceramic Science and Engineering, p. 182, 1984.*

* cited by examiner

Primary Examiner—David Sample
(74) Attorney, Agent, or Firm—Oliff & Berridge, PLC

(57) ABSTRACT

An optical glass comprises the following composition in mass percent of: $SiO_2$ 18–29%; PbO 68–78%; and $TeO_2$ 0.1–3.5%; wherein the glass has optical constants which are a refractive index (nd) having a range of 1.75 to 1.87 and an Abbe number (vb) having a range of 21 to 28; and a wavelength of a light transmitted through the glass having a thickness of 10±0.1 mm at a transmittance of 80% by including a reflection loss, is not more than 420 nm.

12 Claims, No Drawings

OPTICAL GLASS

TECHNICAL FIELD

The present invention relates to an optical glass having optical constants which are a refractive index (nd) having a range of 1.75 to 1.87 and an Abbe number (vd) having a range of 21 to 28, wherein a light transmittance is excellent to a short wavelength band. In particular, the present invention relates to an optical glass having an excellent light transmittance to a short wavelength band, and optical constants which are a refractive index (nd) having a range of 1.80 to 1.87 and an Abbe number (vd) having a range of 21 to 26, and having a photoelastic constant ($\beta$) having an absolute value of not more than $0.2 \times 10^{-5}$ nm/cm/Pa in case of e-line (wavelength 546.07 nm), the optical glass being especially suitable for being used for a spatial light modulation element for carrying out a polarization modulation or for a polarization optical system, such as a beam splitter or the like.

BACKGROUND OF THE INVENTION

In recent years, an optical system utilizing a polarization, that is, a polarization optical system is used in various fields, such as a liquid crystal projector or the like. For example, a spatial light modulation element for spatially modulating a polarization, a polarizing beam splitter for separating a light into S-polarization and P-polarization and the like are used for a liquid crystal projector or the like. In these polarization optical systems, it is desired to control the properties of polarization at a high accuracy.

In optical parts, such as a substrate, a prism for a polarization optical system, or the like, when a material having an optical anisotropy is used in a part which is required to keep the properties of polarization, a phase difference (optical path difference) between a transmitted principal ray and an extraordinary ray perpendicular to the principal ray is changed as compared with the difference before a principal ray is transmitted through the material. Because the properties of polarization cannot be kept, it is necessary that a material having an optical isotropy should be used for these parts.

A glass in which strains are sufficiently removed, in particular, an optical glass has an optical isotropy. Further, the durability, the strength and the light transmittance of the optical glass are more excellent than those of the other materials. There are various types of optical glasses having various optical constants. The optical glasses are more selective in an optical design. Therefore, the optical glasses have been used for a polarization optical system before. In particular, S-BSL7 (which is a trade name of the optical glass manufactured by Kabushiki Kaisha Ohara) is inexpensive and has a good durability. Further, the dispersion thereof is small. Therefore, the S-BSL7 is often used in a polarization optical system.

However, even though the above-mentioned optical glass having an optical isotropy according to an earlier development was used in an optical part of a polarization optical system, the optical glass has an optical anisotropy caused by the photoelastic effect when mechanical stress and thermal stress are applied to these parts, that is, has a double refraction property. As a result, there was a problem that it is difficult to obtain desired properties of polarization. The above mechanical stress is caused, for example, by joining a material having a coefficient of thermal expansion which is different from that of the glass, to the glass. The above thermal stress is caused, for example, by generating heat from peripheral devices, or by generating heat from the glass itself because of absorption of energy of a transmitted light. An amount of the double refraction which the glass induces by applying these stresses to the glass, can be represented by using the optical path difference. When $\delta$ (nm) is the optical path difference, d (cm) is the thickness of the glass and F (Pa) is the stress, the following equation (1) holds. The equation (1) means that the more the optical path difference increases, the more the double refraction increases.

$$\delta = \beta \cdot d \cdot F \qquad (1)$$

In the equation (1), the proportional constant ($\beta$) is called photoelastic constant. The values thereof vary in type of glass. As shown in the equation (1), when the stress (F) applied to the glass and the thickness (d) of the glass are constant, the smaller the absolute value of the photoelastic constant ($\beta$) of the glass is, the shorter the optical path difference ($\delta$) is, that is, the smaller the double refraction is. In the above S-BSL7 (which is a trade name of the optical glass manufactured by Kabushiki Kaisha Ohara), the value of the $\beta$ is $2.79 \times 10^{-5}$ nm/cm/Pa in case of e-line (wavelength 546.07 nm), and is large. In order to control the properties of polarization at a high accuracy in the polarization optical system as described above, the glass is required to have a small absolute value of the photoelastic constant ($\beta$).

In an earlier development, as a glass having a small photoelastic constant $\beta$, PBH53 (which is a trade name of the optical glass manufactured by Kabushiki Kaisha Ohara) having a composition of $SiO_2$—PbO system wherein the refractive index (nd) is about 1.847 and the Abbe number (vd) is 23.9, and equivalent glasses manufactured by other companies, have been known. These glasses have sufficiently small photoelastic constants ($\beta$) of less than $0.1 \times 10^{-5}$ nm/cm/Pa in case of e-line (wavelength 546.07 nm). However, in a short wavelength band of not more than 450 nm, the light transmittance cannot be sufficiently obtained. Because a difference between the intensities of three separated lights, blue (B), green (G) and red (R) which are used in a liquid crystal projector or the like, is caused, it is necessary that the intensities of the lights are adjusted in accordance with the blue light (B) having a low intensity. As a result, there is a problem that an amount of light to be projected from a liquid crystal projector or the like, is not sufficient.

An object of the present invention is to provide an optical glass having optical constants which are a refractive index (nd) having a range of 1.75 to 1.87 and an Abbe number (vd) having a range of 21 to 28, wherein a light transmittance is excellent to a short wavelength band, in consideration of the above circumstances of the earlier development. In particular, an object of the invention is to provide an optical glass having optical constants which are a refractive index (nd) having a range of 1.80 to 1.87 and an Abbe number (vd) having a range of 21 to 26, having an excellent light transmittance to a short wavelength band, and having a photoelastic constant ($\beta$) having a small absolute value.

DISCLOSURE OF THE INVENTION

In order to accomplish the object, the inventors have examined and researched an optical glass. As a result, the inventors have found that an optical glass having optical constants which are a refractive index (nd) having a range of 1.75 to 1.87 and an Abbe number (vd) having a range of 21 to 28, wherein a light transmittance is excellent to a short wavelength band as compared with that of an optical glass according to an earlier development, can be obtained by adding the component $TeO_2$ to a glass having a composition system including $SiO_2$ and PbO. Further, the inventors have found that an optical glass having optical constants which are a refractive index (nd) having a range of 1.80 to 1.87 and an Abbe number (vd) having a range of 21 to 26, wherein a light transmittance is excellent to a short wavelength band, and an absolute value of a photoelastic constant (β) is small, can be obtained. Then, the present invention has been accomplished.

That is, in order to accomplish an object of providing an optical glass having optical constants which are a refractive index (nd) having a range of 1.75 to 1.87 and an Abbe number (vd) having a range of 21 to 28, wherein a light transmittance is excellent to a short wavelength band, in accordance with the first aspect of the present invention, an optical glass comprises the following composition in mass percent of: $SiO_2$ 18–29%, PbO 68–78%, and $TeO_2$ 0.1–3.5%; wherein the glass has optical constants which are a refractive index (nd) having a range of 1.75 to 1.87 and an Abbe number (vb) having a range of 21 to 28; and a wavelength of a light transmitted through the glass having a thickness of 10±0.1 mm at a transmittance of 80% by including a reflection loss, is not more than 420 nm.

Further, the optical glass according to the first aspect of the present invention, may comprise the following composition in mass percent of: $SiO_2$ 18–29%; PbO 68–78%; $TeO_2$ 0.1–3.5%; $B_2O_3$ 0–6%; $R_2O$ 0–5%, the $R_2O$ being one or more selected from the group consisting of $Li_2O$, $Na_2O$ and $K_2O$; R'O 0–5%, the R'O being one or more selected from the group consisting of SrO, BaO and ZnO; $GeO_2$ 0–5%; $Al_2O_3$ 0–3%; $Nb_2O_5$ 0–3%; $In_2O_3$ 0–3.5%; $Ga_2O_3$ 0–3.5%, a total amount of $In_2O_3$+$Ga_2O_3$ being 0–3.5%; $As_2O_3$ 0–1%; $Sb_2O_3$ 0–1%; and a total amount of F elements of one or more fluorides which are partially or wholly substituted for one or more oxides of each metal element described above 0–2%; wherein the optical glass comprises the $GeO_2$, the $Al_2O_3$, the $Nb_2O_5$ and the F elements in a total amount of 0–5%.

According to the first aspect of the present invention, in the optical glass, an amount of the $R_2O$ may be in a range of 0 mass % to less than 0.3 mass %, the $R_2O$ being one or more selected from the group consisting of $Li_2O$, $Na_2O$ and $K_2O$.

According to the first aspect of the present invention, in the optical glass, an amount of the $R_2O$ may be in a range of 0 mass % to less than 0.1 mass %, the $R_2O$ being one or more selected from the group consisting of $Li_2O$, $Na_2O$ and $K_2O$.

In order to accomplish an object of providing an optical glass having optical constants which are a refractive index (nd) having a range of 1.80 to 1.87 and an Abbe number (vd) having a range of 21 to 26, wherein a light transmittance is excellent to a short wavelength band and the optical glass has a photoelastic constant (β) having a small absolute value, in accordance with the second aspect of the present invention, an optical glass comprises the following composition in mass percent of: $SiO_2$ 18–27%; PbO 71–78%; and $TeO_2$ 0.2–3.5%; wherein the glass has optical constants which are a refractive index (nd) having a range of 1.80 to 1.87 and an Abbe number (vb) having a range of 21 to 26; the glass has a photoelastic constant (β) having an absolute value of not more than $0.2 \times 10^{-5}$ nm/cm/Pa in case of e-line (wavelength 546.07 nm); and a wavelength of a light transmitted through the glass having a thickness of 10±0.1 mm at a transmittance of 80% by including a reflection loss, is not more than 420 nm.

Further, the optical glass according to the second aspect of the present invention, may comprise the following composition in mass percent of: $SiO_2$ 18–27%; PbO 71–78%; $TeO_2$ 0.2–3.5%; $B_2O_3$ 0–6%; $R_2O$ 0–5%, the $R_2O$ being one or more selected from the group consisting of $Li_2O$, $Na_2O$ and $K_2O$; R'O 0–5%, the R'O being one or more selected from the group consisting of SrO, BaO and ZnO; $GeO_2$ 0–5%; $Al_2O_3$ 0–3%; $Nb_2O_5$ 0–3%; $In_2O_3$ 0–3.5%; $Ga_2O_3$ 0–3.5%, a total amount of $In_2O_3$+$Ga_2O_3$ being 0–3.5%; $As_2O_3$ 0–1%; $Sb_2O_3$ 0–1%; and a total amount of F elements of one or more fluorides which are partially or wholly substituted for one or more oxides of each metal element described above 0–2%; wherein the optical glass comprises the $GeO_2$, the $Al_2O_3$, the $Nb_2O_5$ and the F elements in a total amount of 0–5%.

According to the second aspect of the present invention, in the optical glass, an amount of the $R_2O$ may be in a range of 0 mass % to less than 0.3 mass %, the $R_2O$ being one or more selected from the group consisting of $Li_2O$, $Na_2O$ and $K_2O$.

According to the second aspect of the present invention, in the optical glass, an amount of the $R_2O$ is in a range of 0 mass % to less than 0.1 mass %, the $R_2O$ being one or more selected from the group consisting of $Li_2O$, $Na_2O$ and $K_2O$.

According to the second aspect of the present invention, the optical glass may have the photoelastic constant (β) having the absolute value of not more than $0.1 \times 10^{-5}$ nm/cm/Pa in case of the e-line (wavelength 546.07 nm).

BEST MODE OF THE INVENTION

Next, in an optical glass according to the first aspect of the present invention, the reason why a composition range of each component is limited as described above, will be explained.

The $SiO_2$ component is an essential component for forming a glass. However, when the $SiO_2$ component is present in an amount of less than 18%, the refractive index of the optical glass is too high and the light transmittance is not sufficient. When the $SiO_2$ component is present in an amount of over 29%, the refractive index becomes low. As a result, it is difficult to obtain a desired refractive index.

The PbO component is one for stably forming a glass having a refractive index in the range from a comparatively low refractive index to a very high refractive index, by combining it with the $SiO_2$. When the PbO component is present in an amount of less than 68%, the refractive index is low. As a result, it is difficult to obtain a desired refractive index. When it is present in an amount of over 78%, the refractive index is too high and the light transmittance deteriorates. Because the glass having an especially excellent light transmittance is easily obtained, the PbO component is preferably present in an amount of less than 73%.

The $TeO_2$ component is an extremely important component in the present invention. The $TeO_2$ component increases the refractive index of the glass, and decreases the melting temperature of the glass to improve the melting property. Further, the $TeO_2$ component has an effect of improving the light transmittance of the glass, in particular, improving the light transmittance in a short wavelength band, dramatically. However, when the $TeO_2$ component is present in an amount of less than 0.1%, the above effects are extremely low. Therefore, it is difficult to confirm the expression of the effects. When the $TeO_2$ component is present in an amount of over 3.5%, on the contrary, the light transmittance of the glass deteriorates and a degree of coloring of the glass increases. It is difficult to obtain a desired transmittance. The glass is easily devitrified. It is difficult to obtain a homogeneous glass. Therefore, it is not preferable that the $TeO_2$ component is present in an amount of over 3.5%. Because a raw material of the $TeO_2$ component is expensive, the $Teo_2$component is preferably present in an amount of not more than 2.5% in order to keep the excellent light transmittance and to save the manufacturing cost of the glass.

In the glass including the $TeO_2$ component, the $B_2O_3$ component has an effect of increasing an amount of the $TeO_2$ component to be compounded in the glass, and an effect of decreasing the melting temperature of the glass. Further, because the $B_2O_3$ component has an effect of improving the light transmittance of the glass, it can be optionally added. In order to obtain these effects, it is sufficient that the $B_2O_3$ component is present in an amount of not more than 6%. When it is present in an amount of over 6%, chemical durability (water resistance, acid resistance, weathering resistance and detergent resistance) of the glass deteriorates. Therefore, it is not preferable that the $B_2O_3$ component is present in an amount of over 6%.

The $R_2O$ component, that is, each component of $Li_2O$, $Na_2O$ and $K_2O$ has an effect of promoting a melt of glass raw material and decreasing a melting temperature when compound glass raw material is melt. Therefore, each of these components can be optionally added. However, when one of these components is present in an amount of over 5%, or when two or more components are present in a total amount of over 5%, the chemical durability (water resistance, acid resistance, weathering resistance and detergent resistance) of the glass deteriorates. As a result, environment resistance which is required for a product, cannot be sufficiently kept. It is preferable that one of these components is present in an amount of less than 0.3%, or that two or more components are present in a total amount of less than 0.3%, because the glass having excellent chemical durability can be easily obtained. It is more preferable that that these components are present in a total amount of less than 0.1%, because the glass having more excellent chemical durability can be easily obtained.

By substituting the R'O component, that is, one or more selected from the group consisting of SrO, BaO and ZnO, for a part of the PbO component, the refractive index of the glass can decrease and the dispersion can be suppressed lower. However, when one or more of these components are present in a total amount of over 5%, it is difficult to obtain a desired optical constant.

The $GeO_2$ component can be optionally added in order to adjust an optical constant of the glass, and to improve chemical durability (water resistance, acid resistance, weathering resistance and detergent resistance) of the glass and resistance to devitrification property. However, when it is present in an amount of over 5%, the melting temperature of the glass increases and the melting property thereof deteriorates.

The $Al_2O_3$ component is effective to adjust the viscosity of the glass and to keep the chemical durability (water resistance, acid resistance, weathering resistance and detergent resistance) of the glass excellently. However, it is not preferable that the $Al_2O_3$ component is present in an amount of over 3%, because the glass is easily devitrified.

The $Nb_2O_5$ component is effective to enhance the chemical durability (water resistance, acid resistance, weathering resistance and detergent resistance) of the glass and to adjust the refractive index of the glass. When the $Nb_2O_5$ component is present in an amount of over 3%, the light transmittance of the glass deteriorates and a degree of coloring of the glass increases. Further, the glass is easily devitrified. Therefore, it is not preferable that the $Nb_2O_5$ component is present in an amount of over 3%.

Both $In_2O_3$ component and $Ga_2O_3$ component have an effect of increasing the refractive index. These components can be optionally added in case of necessity. When these components are present in a total amount of over 3.5%, the light transmittance of the glass deteriorates and a degree of coloring of the glass increases. A desired transmittance cannot be obtained. The glass is easily devitrified. Further, it is difficult to obtain a homogeneous glass. Therefore, it is not preferable that these components are present in a total amount of over 3.5%.

Both $As_2O_3$ component and $Sb_2O_3$ component are generally used as a refining agent. In order to obtain the refining effect, it is sufficient that each component is present in an amount of not more than 1%. In the glass according to the invention, because the $As_2O_3$ component has not only the refining effect but also an effect of improving the light transmittance of the glass, it is preferable to use the $As_2O_3$ component as a refining agent.

One or more fluorides which are partially or wholly substituted for one or more oxides of each metal element explained above, has an effect of improving the light transmittance of the glass and are effective to adjust the refractive index of the glass lower. However, in order to keep the resistance to devitrification property of the glass, the F elements of the fluorides should be present in a total amount of not more than 2%. It is not possible that the $GeO_2$ component, the $Al_2O_3$ component, the $Nb_2O_5$ component and the F elements are present in a total amount of over 5%, because the resistance to devitrification property of the glass deteriorates and the glass is easily colored.

Next, in an optical glass according to the second aspect of the present invention, the reason why a composition range of each component is limited as described above, will be explained.

The $SiO_2$ component is an essential component for forming a glass. However, when the $SiO_2$ component is present in an amount of less than 18%, the refractive index of the optical glass is too high and the light transmittance is not sufficient. When the $SiO_2$ component is present in an amount of over 27%, the refractive index becomes low. As a result, it is difficult to obtain a desired refractive index.

The PbO component is one for stably forming a glass having a refractive index in the range from a comparatively low refractive index to a very high refractive index, by combining it with the $SiO_2$. Further, the PbO component is an essential component for minimizing the absolute value of the photoelastic constant ($\beta$). However, when the PbO component is present in an amount of less than 71%, the photoelastic constant ($\beta$) becomes large. As a result, a desired photoelastic constant cannot be obtained. Further, the refractive index is low. As a result, it is difficult to obtain a desired refractive index. When it is present in an amount of over 78%, the refractive index is too high and the light transmittance deteriorates. In order to easily obtain the glass having an especially excellent light transmittance, the PbO component is preferably present in an amount of not more than 73%.

The $TeO_2$ component is an extremely important component in the present invention. The $TeO_2$ component increases the refractive index of the glass, and decreases the melting temperature of the glass to improve the melting property. Further, the $TeO_2$ component has an effect of improving the light transmittance of the glass, in particular, improving the light transmittance in a short wavelength band, dramatically. Further, the $TeO_2$ component has an effect of minimizing the absolute value of the photoelastic constant ($\beta$) in the $SiO_2$—PbO system glass. However, when the $TeO_2$ component is present in an amount of less than 0.2%, these effects are extremely low. Therefore, it is difficult to confirm the expression of the effects. When the $TeO_2$ component is present in an amount of over 3.5%, on the contrary, the light transmittance of the glass deteriorates and a degree of coloring of the glass increases. It is difficult to obtain a desired transmittance. The glass is easily devitrified. It is difficult to obtain a homogeneous glass. Therefore, it is not preferable that the $TeO_2$ component is present in an amount of over 3.5%. Because a raw material of the $TeO_2$ component is expensive, the $TeO_2$ component is preferably present in an amount of not more than 2.5% in order to keep the excellent light transmittance and to save the manufacturing cost of the glass.

In the glass including the $TeO_2$ component, the $B_2O_3$ component has an effect of increasing an amount of the $TeO_2$ component to be compounded in the glass, and an effect of decreasing the melting temperature of the glass. Further, because the $B_2O_3$ component has an effect of improving the light transmittance of the glass, it can be optionally added. In order to obtain these effects, it is sufficient that the $B_2O_3$ component is present in an amount of not more than 6%. It is not preferable that the $B_2O_3$ component is present in an amount of over 6%, because the chemical durability (water resistance, acid resistance, weathering resistance and detergent resistance) of the glass deteriorates. Further, because the $B_2O_3$ component has a tendency to increase the value of the photoelastic constant ($\beta$), it is more preferable that it is present in an amount of not more than 3%.

The reason for limiting the composition range of each component other than the above components of the optical glass according to the second aspect of the present invention, is the same as that of each component of the optical glass according to the first aspect of the present invention. The explanation thereof is omitted.

EXAMPLE

Next, composition examples (No. 1 to No. 94) of the optical glass according to the present invention and comparative examples (No. A and No. B) of the optical glass according to an earlier development are shown in Tables 1 to 12, together with the refractive index (nd), the Abbe number (vd), the wavelength ($\lambda 80$) of a light transmitted at the transmittance of 80% by including the reflection loss, and the photoelastic constant ($\beta$), respectively. The $\lambda 80$ shows the result of measuring the wavelength by using a glass sample of which both surfaces were polished and which has a thickness of 10 mm. The photoelastic constant ($\beta$) is calculated from the equation (1) by substituting 0.8 cm for the light transmitting thickness of the glass sample, that is, the thickness (d) in the equation (1), and by measuring the optical path difference caused by the double refraction generated by transmitting a light having the e-line (wavelength 546.07 nm) in a state of applying a constant stress to the glass sample externally.

TABLE 1

(mass %)
Composition examples

| No. | 1 | 2 | 3 | 4 | 5 | 6 | 7 | 8 | 9 |
|---|---|---|---|---|---|---|---|---|---|
| $SiO_2$ | 23.00 | 27.40 | 26.50 | 24.00 | 25.80 | 24.30 | 21.00 | 27.90 | 24.00 |
| $B_2O_3$ | 3.00 | | | | 1.00 | | 1.00 | 1.00 | 0.50 |
| PbO | 68.90 | 70.90 | 70.00 | 70.00 | 70.00 | 70.00 | 70.00 | 69.00 | 69.20 |
| $TeO_2$ | 1.50 | 0.10 | 1.00 | 0.70 | 1.00 | 0.50 | 0.30 | 0.50 | 0.50 |
| $Na_2O$ | | 0.50 | 2.00 | 5.00 | | | 1.00 | 0.50 | 0.50 |
| $K_2O$ | 1.00 | 1.00 | | | 2.00 | 5.00 | 1.50 | 1.00 | |
| $As_2O_3$ | 0.10 | | 0.50 | | | 0.20 | | 0.10 | 0.30 |
| $Sb_2O_3$ | | 0.10 | | 0.30 | 0.20 | | 0.20 | | |
| BaO | 2.50 | | | | | | 5.00 | | |
| SrO | | | | | | | | | 5.00 |
| nd | 1.7743 | 1.8049 | 1.8000 | 1.7872 | 1.8012 | 1.7879 | 1.8079 | 1.7934 | 1.8099 |
| vd | 21.7 | 25.4 | 25.7 | 25.7 | 25.5 | 25.7 | 23.7 | 26.0 | 22.5 |
| $\lambda 80$ | 398 | 401 | 406 | 405 | 403 | 404 | 406 | 401 | 401 |
| $\beta \times 10^{-5}$ nm/cm/Pa | 0.98 | 0.65 | 0.64 | 1.00 | 0.66 | 1.00 | 0.97 | 0.98 | 0.78 |

TABLE 2

(mass %)
Composition examples

| No. | 10 | 11 | 12 | 13 | 14 | 15 |
|---|---|---|---|---|---|---|
| $SiO_2$ | 24.59 | 29.00 | 23.65 | 24.00 | 28.410 | 28.30 |
| $B_2O_3$ | 1.00 | 0.30 | 1.50 | 0.98 | | |
| PbO | 69.00 | 68.20 | 70.90 | 70.90 | 69.082 | 70.00 |
| $TeO_2$ | 0.61 | 0.70 | 3.00 | 0.22 | 2.000 | 0.50 |
| $Li_2O$ | | | | | 0.158 | |
| $Na_2O$ | 0.97 | 0.50 | 0.15 | | | 1.00 |
| $K_2O$ | 1.63 | 1.00 | | 0.40 | | |
| $As_2O_3$ | 0.20 | 0.30 | 0.30 | | 0.350 | |
| $Sb_2O_3$ | | | | 0.30 | | 0.20 |
| $Al_2O_3$ | 2.00 | | | | | |

TABLE 2-continued

| | (mass %) Composition examples | | | | | |
|---|---|---|---|---|---|---|
| No. | 10 | 11 | 12 | 13 | 14 | 15 |
| $In_2O_3$ | | | 0.50 | | | |
| $Nb_2O_5$ | | | | 3.00 | | |
| $KHF_2$ | | | | 0.20 | | |
| nd | 1.7876 | 1.7843 | 1.8143 | 1.8467 | 1.7917 | 1.7879 |
| υd | 26.4 | 26.2 | 25.4 | 23.9 | 25.7 | 25.7 |
| λ80 | 408 | 415 | 410 | 420 | 408 | 404 |
| β × $10^{-5}$ nm/cm/Pa | 0.89 | 0.84 | 0.58 | 0.70 | 0.48 | 0.60 |

TABLE 3

| | (mass %) Composition examples | | | | | | | | |
|---|---|---|---|---|---|---|---|---|---|
| No. | 16 | 17 | 18 | 19 | 20 | 21 | 22 | 23 | 24 |
| $SiO_2$ | 23.72 | 28.40 | 28.30 | 28.00 | 27.55 | 29.02 | 23.35 | 29.25 | 24.22 |
| $B_2O_3$ | 3.00 | 0.25 | | | 1.00 | | 1.00 | 1.00 | 0.50 |
| PbO | 68.90 | 70.90 | 70.00 | 70.80 | 70.00 | 70.00 | 70.00 | 69.00 | 69.20 |
| $TeO_2$ | 1.50 | 0.10 | 1.00 | 0.70 | 1.00 | 0.50 | 0.30 | 0.50 | 0.50 |
| $Na_2O$ | | 0.20 | 0.20 | 0.20 | | | 0.10 | 0.05 | 0.28 |
| $K_2O$ | 0.28 | 0.05 | | | 0.25 | 0.28 | 0.05 | 0.10 | |
| $As_2O_3$ | 0.10 | | 0.50 | | | 0.20 | | 0.10 | 0.30 |
| $Sb_2O_3$ | | 0.10 | | 0.30 | 0.20 | | 0.20 | | |
| BaO | 2.50 | | | | | | 5.00 | | |
| SrO | | | | | | | | | 5.00 |
| nd | 1.7738 | 1.8045 | 1.7980 | 1.7952 | 1.7992 | 1.7798 | 1.8055 | 1.7931 | 1.8099 |
| υd | 21.7 | 25.4 | 25.7 | 25.7 | 25.6 | 25.8 | 23.7 | 26.0 | 22.5 |
| λ80 | 398 | 401 | 406 | 405 | 403 | 404 | 406 | 401 | 401 |
| β × $10^{-5}$ nm/cm/Pa | 0.98 | 0.65 | 0.64 | 1.00 | 0.66 | 1.00 | 0.97 | 0.98 | 0.78 |

TABLE 4

| | (mass %) Composition examples | | | | | | | | |
|---|---|---|---|---|---|---|---|---|---|
| No. | 25 | 26 | 27 | 28 | 29 | 30 | 31 | 32 | 33 |
| $SiO_2$ | 26.99 | 30.30 | 24.20 | 22.11 | 23.04 | 22.11 | 24.00 | 18.50 | 23.00 |
| $B_2O_3$ | 1.00 | 0.30 | 0.98 | 0.50 | 1.50 | 0.50 | 0.50 | 6.00 | 1.50 |
| PbO | 69.00 | 68.20 | 70.90 | 74.00 | 73.66 | 74.00 | 72.30 | 73.70 | 71.20 |
| $TeO_2$ | 0.61 | 0.70 | 0.22 | 0.59 | 1.00 | 0.59 | 0.50 | 1.00 | 3.50 |
| $Na_2O$ | 0.17 | 0.05 | | 0.50 | 0.50 | 0.50 | 0.50 | 0.50 | 0.50 |
| $K_2O$ | 0.03 | 0.15 | 0.20 | | | | | | |
| $As_2O_3$ | 0.20 | 0.30 | | 0.30 | 0.30 | 0.30 | | 0.30 | 0.30 |
| $Sb_2O_3$ | | | 0.30 | | | | 0.20 | | |
| ZnO | | | | | | | 2.00 | | |
| $Al_2O_3$ | 2.00 | | | | | | | | |
| $GeO_2$ | | | | | 2.00 | | | | |
| $Nb_2O_5$ | | | 3.00 | | | | | | |
| $KHF_2$ | | | 0.20 | | | 2.00 | | | |
| nd | 1.7872 | 1.7831 | 1.8467 | 1.8133 | 1.8499 | 1.8060 | 1.8244 | 1.8509 | 1.8453 |
| υd | 26.4 | 26.2 | 23.9 | 22.7 | 24.1 | 22.8 | 23.5 | 24.0 | 24.1 |
| λ80 | 408 | 415 | 420 | 403 | 410 | 405 | 419 | 407 | 411 |
| β × $10^{-5}$ nm/cm/Pa | 0.89 | 0.84 | 0.42 | −0.18 | 0.03 | −0.20 | 0.13 | 0.20 | 0.13 |

TABLE 5

| | (mass %) Composition examples | | | | | | | | |
|---|---|---|---|---|---|---|---|---|---|
| No. | 34 | 35 | 36 | 37 | 38 | 39 | 40 | 41 | 42 |
| $SiO_2$ | 23.00 | 24.00 | 23.00 | 23.10 | 24.00 | 23.05 | 23.20 | 18.00 | 24.10 |
| $B_2O_3$ | 1.50 | 0.50 | 1.50 | 1.20 | 0.50 | 1.50 | 1.50 | 3.00 | 0.50 |
| PbO | 71.70 | 73.80 | 74.20 | 72.70 | 74.20 | 74.40 | 72.20 | 77.20 | 74.30 |
| $TeO_2$ | 3.00 | 0.90 | 0.50 | 2.00 | 0.50 | 0.25 | 2.40 | 1.00 | 0.50 |
| $Na_2O$ | 0.50 | 0.50 | 0.50 | 0.60 | 0.50 | 0.50 | 0.40 | 0.50 | |
| $K_2O$ | | | | 0.10 | | | | | 0.50 |
| $As_2O_3$ | 0.30 | 0.30 | 0.30 | 0.30 | 0.30 | 0.30 | 0.30 | 0.30 | |
| $Sb_2O_3$ | | | | | | | | | 0.10 |
| nd | 1.8452 | 1.8476 | 1.8505 | 1.8452 | 1.8485 | 1.8503 | 1.8341 | 1.8644 | 1.8460 |
| υd | 24.0 | 24.0 | 24.0 | 24.0 | 23.9 | 24.1 | 23.5 | 23.2 | 24.0 |
| λ80 | 411 | 409 | 408 | 411 | 409 | 411 | 411 | 420 | 415 |
| $\beta \times 10^{-5}$ nm/cm/Pa | 0.13 | -0.01 | 0.02 | 0.08 | -0.04 | 0.02 | 0.06 | -0.03 | 0.08 |

TABLE 6

| | (mass %) Composition examples | | | | | |
|---|---|---|---|---|---|---|
| No. | 43 | 44 | 45 | 46 | 47 | 48 |
| $SiO_2$ | 23.30 | 22.10 | 24.60 | 23.00 | 22.90 | 23.00 |
| $B_2O_3$ | 1.40 | 0.50 | | 1.50 | 1.70 | 1.50 |
| PbO | 74.30 | 74.20 | 74.55 | 73.70 | 74.00 | 73.70 |
| $TeO_2$ | 0.50 | 1.40 | 0.25 | 1.00 | 0.80 | 1.00 |
| $Na_2O$ | 0.30 | 1.20 | | 0.50 | 0.60 | 0.50 |
| $K_2O$ | | 0.40 | 0.50 | 0.10 | | |
| $As_2O_3$ | 0.20 | 0.20 | 0.10 | 0.20 | | 0.30 |
| nd | 1.8428 | 1.8536 | 1.8465 | 1.8483 | 1.8358 | 1.8493 |
| υd | 23.0 | 22.9 | 23.9 | 24.1 | 23.1 | 23.9 |
| λ80 | 408 | 407 | 408 | 407 | 408 | 407 |
| $\beta \times 10^{-5}$ nm/cm/Pa | 0.02 | 0.04 | 0.06 | 0.05 | 0.03 | 0.05 |

TABLE 7

| | (mass %) Composition examples | | | | | |
|---|---|---|---|---|---|---|
| No. | 49 | 50 | 51 | 52 | 53 | 54 |
| $SiO_2$ | 22.41 | 22.41 | 24.30 | 18.80 | 23.30 | 23.30 |
| $B_2O_3$ | 0.50 | 0.50 | 0.50 | 6.00 | 1.50 | 1.50 |
| PbO | 74.00 | 74.00 | 72.30 | 73.70 | 71.20 | 71.70 |
| $TeO_2$ | 0.59 | 0.59 | 0.50 | 1.00 | 3.50 | 3.00 |
| $Na_2O$ | 0.20 | 0.20 | 0.20 | 0.20 | 0.20 | 0.20 |
| $As_2O_3$ | 0.30 | 0.30 | | 0.30 | 0.30 | 0.30 |
| $Sb_2O_3$ | | | 0.20 | | | |
| ZnO | | | 2.00 | | | |
| $GeO_2$ | 2.00 | | | | | |
| $KHF_2$ | | 2.00 | | | | |
| nd | 1.8133 | 1.8060 | 1.8239 | 1.8494 | 1.8448 | 1.8447 |
| υd | 22.7 | 22.8 | 23.5 | 24.0 | 24.1 | 24.0 |
| λ80 | 403 | 405 | 419 | 407 | 411 | 411 |
| $\beta \times 10^{-5}$ nm/cm/Pa | -0.18 | -0.20 | 0.13 | 0.20 | 0.13 | 0.13 |

TABLE 8

| | (mass %) Composition examples | | | | | | | | |
|---|---|---|---|---|---|---|---|---|---|
| No. | 55 | 56 | 57 | 58 | 59 | 60 | 61 | 62 | 63 |
| $SiO_2$ | 24.25 | 23.25 | 23.42 | 24.25 | 22.40 | 23.30 | 23.40 | 18.25 | 24.35 |
| $B_2O_3$ | 0.50 | 1.50 | 1.20 | 0.50 | 1.50 | 1.50 | 1.50 | 3.00 | 0.50 |
| PbO | 73.80 | 74.20 | 72.70 | 74.20 | 74.10 | 74.40 | 72.20 | 77.20 | 74.30 |
| $TeO_2$ | 0.90 | 0.50 | 2.00 | 0.50 | 1.60 | 0.25 | 2.40 | 1.00 | 0.50 |
| $Na_2O$ | 0.25 | 0.25 | 0.28 | 0.25 | 0.20 | 0.25 | 0.20 | 0.25 | |
| $K_2O$ | | | | 0.10 | | | | | 0.25 |

TABLE 8-continued

| | (mass %) Composition examples | | | | | | | | |
|---|---|---|---|---|---|---|---|---|---|
| No. | 55 | 56 | 57 | 58 | 59 | 60 | 61 | 62 | 63 |
| $As_2O_3$ | 0.30 | 0.30 | 0.30 | 0.30 | 0.20 | 0.30 | 0.30 | 0.30 | |
| $Sb_2O_3$ | | | | | | | | | 0.10 |
| nd | 1.8471 | 1.8495 | 1.8447 | 1.8480 | 1.8559 | 1.8497 | 1.8339 | 1.8640 | 1.8454 |
| υd | 24.0 | 24.0 | 24.0 | 23.9 | 22.9 | 24.1 | 23.5 | 23.2 | 24.0 |
| λ80 | 409 | 408 | 411 | 409 | 408 | 411 | 411 | 420 | 415 |
| $\beta \times 10^{-5}$ nm/cm/Pa | −0.01 | 0.02 | 0.08 | −0.04 | 0.02 | 0.02 | 0.06 | −0.03 | 0.08 |

TABLE 9

| | (mass %) Composition examples | | | | | | | | |
|---|---|---|---|---|---|---|---|---|---|
| No. | 64 | 65 | 66 | 67 | 68 | 69 | 70 | 71 | 72 |
| $SiO_2$ | 23.32 | 23.45 | 24.90 | 22.50 | 23.50 | 23.35 | 23.30 | 23.35 | 26.25 |
| $B_2O_3$ | 1.40 | 0.50 | | 1.30 | 1.30 | 1.50 | 1.70 | 1.50 | 0.50 |
| PbO | 74.30 | 74.20 | 74.55 | 73.90 | 73.60 | 73.70 | 74.00 | 73.70 | 72.30 |
| $TeO_2$ | 0.50 | 1.40 | 0.25 | 2.00 | 1.20 | 1.00 | 0.80 | 1.00 | 0.50 |
| $Na_2O$ | 0.28 | 0.15 | | 0.20 | 0.20 | 0.20 | 0.20 | 0.15 | 0.25 |
| $K_2O$ | | 0.10 | 0.20 | | | 0.05 | | | |
| $As_2O_3$ | 0.20 | 0.20 | 0.10 | 0.10 | 0.20 | 0.20 | | 0.30 | |
| $Sb_2O_3$ | | | | | | | | | 0.20 |
| nd | 1.8429 | 1.8563 | 1.8471 | 1.8522 | 1.8440 | 1.8490 | 1.8366 | 1.8500 | 1.8327 |
| υd | 23.0 | 22.9 | 23.9 | 23.8 | 23.0 | 24.1 | 23.1 | 23.9 | 23.4 |
| λ80 | 408 | 407 | 408 | 409 | 407 | 407 | 408 | 407 | 410 |
| $\beta \times 10^{-5}$ nm/cm/Pa | 0.02 | 0.04 | 0.06 | 0.06 | 0.04 | 0.05 | 0.03 | 0.05 | 0.09 |

TABLE 10

| | (mass %) Composition examples | | | | | | | | |
|---|---|---|---|---|---|---|---|---|---|
| No. | 73 | 74 | 75 | 76 | 77 | 78 | 79 | 80 | 81 |
| $SiO_2$ | 23.60 | 23.65 | 24.940 | 23.40 | 24.45 | 22.40 | 23.55 | 22.51 | 23.26 |
| $B_2O_3$ | 2.10 | 1.00 | | 1.30 | 0.50 | 1.50 | 1.50 | 1.30 | 0.50 |
| PbO | 71.30 | 71.20 | 73.560 | 73.70 | 73.80 | 74.22 | 72.20 | 74.00 | 73.96 |
| $TeO_2$ | 2.50 | 1.00 | 1.000 | 1.20 | 0.90 | 1.60 | 2.40 | 2.00 | 1.00 |
| $Li_2O$ | | | 0.195 | 0.06 | | | 0.01 | | |
| $Na_2O$ | 0.10 | 0.26 | 0.005 | 0.02 | | 0.08 | 0.04 | 0.04 | |
| $K_2O$ | | | | | 0.05 | | | 0.05 | |
| $As_2O_3$ | 0.20 | 0.39 | 0.300 | 0.32 | 0.30 | 0.20 | 0.30 | 0.10 | 0.28 |
| $Al_2O_3$ | | | | | | | | | 1.00 |
| $In_2O_3$ | 0.10 | 1.50 | | | | | | | |
| $Ga_2O_3$ | 0.10 | 1.00 | | | | | | | |
| nd | 1.8460 | 1.8383 | 1.8331 | 1.8425 | 1.8467 | 1.8575 | 1.8341 | 1.8535 | 1.8515 |
| υd | 23.5 | 24.4 | 23.5 | 23.0 | 24.1 | 22.8 | 23.2 | 23.8 | 24.0 |
| λ80 | 411 | 419 | 407 | 407 | 409 | 409 | 420 | 409 | 418 |
| $\beta \times 10^{-5}$ nm/cm/Pa | 0.06 | 0.13 | −0.06 | 0.03 | 0.01 | 0.00 | −0.03 | 0.04 | 0.12 |

TABLE 11

| | (mass %) Composition examples | | | | | | | |
|---|---|---|---|---|---|---|---|---|
| No. | 82 | 83 | 84 | 85 | 86 | 87 | 88 | 89 |
| $SiO_2$ | 22.41 | 23.43 | 18.44 | 23.04 | 23.60 | 23.94 | 28.40 | 27.64 |
| $B_2O_3$ | 1.30 | 1.70 | 3.00 | 0.50 | 1.00 | 3.00 | 0.25 | 1.00 |
| PbO | 74.10 | 74.00 | 77.20 | 74.16 | 69.75 | 68.90 | 70.90 | 70.10 |
| $TeO_2$ | 2.00 | 0.80 | 1.00 | 0.94 | 0.30 | 1.50 | 0.10 | 1.00 |
| $Li_2O$ | | | 0.02 | | | | | 0.06 |
| $Na_2O$ | 0.09 | 0.07 | | 0.06 | | 0.06 | 0.05 | |
| $K_2O$ | | | | 0.04 | | 0.05 | | |
| BaO | | | | | 5.00 | 2.50 | | |
| $Al_2O_3$ | | | | | 1.00 | | | |

As shown in Tables 1 to 12, any optical glass shown in the composition examples (No. 1 to No. 94) of the optical glass according to the first aspect of the present invention, has optical constants which are a refractive index (nd) having a range of 1.75 to 1.87 and an Abbe number (vd) having a range of 21 to 28. In the optical glasses, the wavelength (λ80) of a light transmitted at the transmittance of 80% by including the reflection loss, is not more than 420 nm. The λ80 of the optical glass according to the first aspect of the present invention, dramatically shifts to a short wavelength side more than that of the optical glass shown in the comparative examples (No. A and No. B) according to an earlier development. A light transmittance of the optical glass according to the first aspect of the invention, is even more excellent to a short wavelength band. Any optical glass shown in the composition examples has excellent resistance to devitrification property and excellent chemical durability. Further, the optical glasses are easily homogenized. In the above composition examples, any optical glass shown in the composition examples (No. 28 to No. 85) of the optical glass according to the second aspect of the present invention, has optical constants which are a refractive index (nd) having a range of 1.80 to 1.87 and an Abbe number (vd) having a range of 21 to 26. The optical glass according to the second aspect of the present invention has a small photoelastic constant (β) which is approximately equivalent to that of the optical glass shown in the comparative examples (No. A and No. B) according to an earlier development. Further, the λ80 of the optical glass according to the second aspect of the present invention, dramatically shifts to a short wavelength side. Therefore, it is found that the light transmittance of the optical glass according to the second aspect of the present invention is more excellent to a short wavelength band than that of the optical glass according to an earlier development.

Any optical glasses according to the composition examples of the present invention, which are shown in Tables 1 to 12, can be easily obtained in the following manufacturing method or the like. General raw material for an optical glass, such as oxide, carbonate, nitrate, hydroxide and the like, are weighed at a predetermined ratio, and mixed. After the mixed raw material are roughly melted in a quartz crucible or the like, the melted raw material is cooled and crushed to prepare a cullet. The obtained cullet is charged in a platinum crucible and is melted at a temperature having a range of 950 to 1200° C. for about 1 to 4 hours in accordance with the melting property depending on the composition. After the melted cullet is stirred and homogenized, it is cast into a die and is annealed.

INDUSTRIAL APPLICABILITY

As described above, the $SiO_2$—PbO—$TeO_2$ system optical glass according to the first aspect of the present invention, has optical constants which are a refractive index (nd) having a range of 1.75 to 1.87 and an Abbe number (vb) having a range of 21 to 28. Further, a wavelength of a light transmitted through the glass having a thickness of 10±0.1 mm at a transmittance of 80% by including a reflection loss, is not more than 420 nm. Because the light transmittance of the glass is excellent to a short wavelength band, the optical glass is useful as an optical part, such as a lens or the like, which is used for an optical system of each type of optical instrument and which is required to have an excellent light transmittance. Further, the $SiO_2$—PbO—$TeO_2$ system optical glass of which the composition range is further limited, according to the second aspect of the present invention, has optical constants which are a refractive index (nd) having a range of 1.80 to 1.87 and an Abbe number (vb) having a range of 21 to 26. Because a wavelength of a light transmitted through the glass having a thickness of 10±0.1 mm at a transmittance of 80% by including a reflection loss, is not more than 420 nm, the light transmittance of the glass is excellent to a short wavelength band. Further, the glass has a photoelastic constant (β) having an absolute value of not more than $0.2 \times 10^{-5}$ nm/cm/Pa in case of e-line (wavelength 546.07 nm). Therefore, the optical glass is useful as an optical part, such as a high refractive lens or the like, which is required to have an excellent light transmittance, or is useful for an optical part required to have an excellent light transmittance, such as a lens, a prism or the like, which is used in a spatial light modulating element for carrying out a polarization modulation or in a polarization optical system, such as a polarization beam splitter or the like.

What is claimed is:

1. An optical glass comprising the following composition in mass percent of:

| | |
|---|---|
| $SiO_2$ | 18–29%; |
| PbO | 68–78%; and |
| $TeO_2$ | 0.1–3.5%; | wherein the glass has optical constants which are a refractive index (nd) having a range of 1.75 to 1.87 and an Abbe number (vb) having a range of 21 to 28; and a wavelength of a light transmitted through the glass having a thickness of 10±0.1 mm at a transmittance of 80% by including a reflection loss, is not more than 420 nm.

2. The optical glass as claimed in claim 1; comprising the following composition in mass percent of:

| | |
|---|---|
| $SiO_2$ | 18–29%; |
| PbO | 68–78%; |
| $TeO_2$ | 0.1–3.5%; |
| $B_2O_3$ | 0–6%; |
| $R_2O$ | 0–5%, | the $R_2O$ being one or more selected from the group consisting of $Li_2O$, $Na_2O$ and $K_2O$;

| | |
|---|---|
| R'O | 0–5%, | the R'O being one or more selected from the group consisting of SrO, BaO and ZnO;

| | |
|---|---|
| $GeO_2$ | 0–5%; |
| $Al_2O_3$ | 0–3%; |
| $Nb_2O_5$ | 0–3%; |
| $In_2O_3$ | 0–3.5%; |
| $Ga_2O_3$ | 0–3.5%; | a total amount of $In_2O_3 + Ga_2O_3$ being 0–3.5%;

| | |
|---|---|
| $As_2O_3$ | 0–1%; |
| $Sb_2O_3$ | 0–1%; and | a total amount of F elements of one or more fluorides which are partially or wholly substituted for one or more oxides of each metal element described above 0–2%;

wherein the optical glass comprises the $GeO_2$, the $Al_2O_3$, the $Nb_2O_5$ and the F elements in a total amount of 0–5%.

3. The optical glass as claimed in claim 2, wherein an amount of the $R_2O$ is in a range of 0 mass % to less than 0.3 mass %, the $R_2O$ being one or more selected from the group consisting of $Li_2O$, $Na_2O$ and $K_2O$.

4. The optical glass as claimed in claim 2, wherein an amount of the $R_2O$ is in a range of 0 mass % to less than 0.1 mass %, the $R_2O$ being one or more selected from the group consisting of $Li_2O$, $Na_2O$ and $K_2O$.

5. An optical glass comprising the following composition in mass percent of:

| | |
|---|---|
| $SiO_2$ | 18–27%; |
| PbO | 71–78%; and |
| $TeO_2$ | 0.2–3.5%; | wherein the glass has optical constants which are a refractive index (nd) having a range of 1.80 to 1.87 and an Abbe number (vb) having a range of 21 to 26; the glass has a photoelastic constant ($\beta$) having an absolute value of not more than $0.2 \times 10^{-5}$ nm/cm/Pa in case of e-line (wavelength 546.07 nm); and a wavelength of a light transmitted through the glass having a thickness of 10±0.1 mm at a transmittance of 80% by including a reflection loss, is not more than 420 nm.

6. The optical glass as claimed in claim 5; comprising the following composition in mass percent of:

| | |
|---|---|
| $SiO_2$ | 18–27%; |
| PbO | 71–78%; |
| $TeO_2$ | 0.2–3.5%; |
| $B_2O_3$ | 0–6%; |
| $R_2O$ | 0–5%, | the $R_2O$ being one or more selected from the group consisting of $Li_2O$, $Na_2O$ and $K_2O$;

| | |
|---|---|
| R'O | 0–5%, | the R'O being one or more selected from the group consisting of SrO, BaO and ZnO;

| | |
|---|---|
| $GeO_2$ | 0–5%; |
| $Al_2O_3$ | 0–3%; |
| $Nb_2O_5$ | 0–3%; |
| $In_2O_3$ | 0–3.5%; |
| $Ga_2O_3$ | 0–3.5%, | a total amount of $In_2O_3+Ga_2O_3$ being 0–3.5%;

| | |
|---|---|
| $As_2O_3$ | 0–1%; |
| $Sb_2O_3$ | 0–1%; and | a total amount of F elements of one or more fluorides which are partially or wholly substituted for one or more oxides of each metal element described above 0–2%;

wherein the optical glass comprises the $GeO_2$, the $Al_2O_3$, the $Nb_2O_5$ and the F elements in a total amount of 0–5%.

7. The optical glass as claimed in claim 6, wherein an amount of the $R_2O$ is in a range of 0 mass % to less than 0.3 mass %, the $R_2O$ being one or more selected from the group consisting of $Li_2O$, $Na_2O$ and $K_2O$.

8. The optical glass as claimed in claim 6, wherein an amount of the $R_2O$ is in a range of 0 mass % to less than 0.1 mass %, the $R_2O$ being one or more selected from the group consisting of $Li_2O$, $Na_2O$ and $K_2O$.

9. The optical glass claimed in claim 5, having the photoelastic constant ($\beta$) having the absolute value of not more than $0.1 \times 10^{-5}$ nm/cm/Pa in case of the e-line (wavelength 546.07 nm).

10. The optical glass claimed in claim 6, having the photoelastic constant ($\beta$) having the absolute value of not more than $0.1 \times 10^{-5}$ nm/cm/Pa in case of the e-line (wavelength 546.07 nm).

11. The optical glass as claimed in claim 7, having the photoelastic constant ($\beta$) having the absolute value of not more than $0.1 \times 10^{-5}$ nm/cm/Pa in case of the e-line (wavelength 546.07 nm).

12. The optical glass claimed in claim 8, having the photoelastic constant ($\beta$) having the absolute value of not more than $0.1 \times 10^{-5}$ nm/cm/Pa in case of the e-line (wavelength 546.07 nm).

* * * * *